United States Patent
Du et al.

(10) Patent No.: US 11,765,320 B2
(45) Date of Patent: Sep. 19, 2023

(54) AVATAR ANIMATION IN VIRTUAL CONFERENCING

(71) Applicant: Google LLC, Mountain View, CA (US)

(72) Inventors: Ruofei Du, San Francisco, CA (US); Alex Olwal, Santa Cruz, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/444,890

(22) Filed: Aug. 11, 2021

(65) Prior Publication Data

US 2023/0051409 A1  Feb. 16, 2023

(51) Int. Cl.
| | |
|---|---|
| H04N 7/15 | (2006.01) |
| G06F 3/01 | (2006.01) |
| G06N 3/04 | (2023.01) |
| G06T 3/60 | (2006.01) |
| G06T 13/20 | (2011.01) |
| G06T 13/40 | (2011.01) |
| G06T 17/20 | (2006.01) |

(52) U.S. Cl.
CPC ............ *H04N 7/157* (2013.01); *G06F 3/013* (2013.01); *G06N 3/04* (2013.01); *G06T 3/608* (2013.01); *G06T 13/205* (2013.01); *G06T 13/40* (2013.01); *G06T 17/20* (2013.01)

(58) Field of Classification Search
CPC .......... H04N 7/157; G06F 3/013; G06N 3/04; G06T 3/608; G06T 13/205; G06T 13/40; G06T 17/20
USPC .............................................. 348/14.02–14.9
See application file for complete search history.

(56) References Cited

U.S. PATENT DOCUMENTS

| | | | |
|---|---|---|---|
| 6,462,767 B1 | 10/2002 | Obata et al. | |
| 9,189,846 B2 * | 11/2015 | Wismüller | .............. G06T 19/00 |
| 9,191,619 B2 | 11/2015 | Liu | |

(Continued)

FOREIGN PATENT DOCUMENTS

| | | |
|---|---|---|
| KR | 20110025718 A | 3/2011 |
| KR | 20110025721 A | 3/2011 |
| KR | 20120018479 A | 3/2012 |

OTHER PUBLICATIONS

"CrazyTalk for Skype 2.0—Avatar Live!", YouTube, Jul. 3, 2007, 1 page.

(Continued)

*Primary Examiner* — Maria El-Zoobi
(74) *Attorney, Agent, or Firm* — Brake Hughes Bellermann LLP

(57) ABSTRACT

According to a general aspect, a method can include receiving a photo of a virtual conference participant, and a depth map based on the photo, and generating a plurality of synthesized images based on the photo. The plurality of synthesized images can have respective simulated gaze directions of the virtual conference participant. The method can also include receiving, during a virtual conference, an indication of a current gaze direction of the virtual conference participant. The method can further include animating, in a display of the virtual conference, an avatar corresponding with the virtual conference participant. The avatar can be based on the photo. Animating the avatar can be based on the photo, the depth map and at least one synthesized image of the plurality of synthesized images, the at least one synthesized image corresponding with the current gaze direction.

25 Claims, 9 Drawing Sheets

(56) References Cited

U.S. PATENT DOCUMENTS

| | | | |
|---|---|---|---|
| 9,432,626 | B2 | 8/2016 | Liu |
| 9,723,265 | B2 | 8/2017 | Liu |
| 10,896,535 | B2 * | 1/2021 | Li .................... G06T 13/40 |
| 2002/0163572 | A1 | 11/2002 | Center et al. |
| 2004/0130614 | A1 | 7/2004 | Valliath et al. |
| 2006/0031291 | A1 | 2/2006 | Beckemeyer |
| 2006/0206560 | A1 | 9/2006 | Kanada |
| 2007/0186002 | A1 | 8/2007 | Campbell et al. |
| 2009/0309955 | A1 | 12/2009 | Gladstone |
| 2010/0128103 | A1 | 5/2010 | Sim et al. |
| 2010/0315483 | A1 | 12/2010 | King |
| 2012/0086769 | A1 | 4/2012 | Huber et al. |
| 2012/0128146 | A1 | 5/2012 | Boss et al. |
| 2012/0281059 | A1 | 11/2012 | Chou et al. |
| 2016/0234475 | A1 | 8/2016 | Courchesne et al. |
| 2019/0026936 | A1 * | 1/2019 | Gorur Sheshagiri ................ G06F 3/0304 |
| 2019/0130629 | A1 | 5/2019 | Chand et al. |
| 2020/0363635 | A1 | 11/2020 | Ilic et al. |
| 2021/0105438 | A1 | 4/2021 | Tong et al. |
| 2022/0166807 | A1 * | 5/2022 | Copley ................ H04L 65/765 |

OTHER PUBLICATIONS

International Search Report and Written Opinion for PCT Application No. PCT/US2022/074147, dated Oct. 27, 2022, 14 pages.

He et al., "Gazechat: Enhancing Virtual Conferences With Gaze-Aware 3D Photos", Proceedings of the 3rd Workshop on Cyber-Security Arms Race, ACMPUB27, New York, NY, USA;, Oct. 10, 2021, pp. 769-782.

He et al., "Who is Looking at Whom? Visualizing Gaze Awareness for Remote Small-Group Conversations", arXiv:2107.06265v2;, Jul. 14, 2021, 24 pages.

Russell et al., "A Text to Visual Speech Instant Messaging System", Internet Citation; www.cms.livjm.ac.uk/pgnet2003/submissions/Paper-40.pdf, Jun. 16, 2004, 4 pages.

Wolf et al., "An Eye for an Eye: a Single Camera Gaze-Replacement Method", IEEE Conference on Computer Vision and Pattern Recognition (CVPR), 2010, pp. 817-824.

* cited by examiner

AVATAR ANIMATION IN VIRTUAL CONFERENCING

FIELD

This disclosure relates virtual conferencing and, more specifically, to approaches for animating photorealistic avatars in a virtual conference based on, e.g., gaze location and/or speech.

BACKGROUND

Virtual conferences are rapidly becoming a prevalent medium for online education, remote collaboration, entertainment, and/or casual meetings, such as with families and friends. However, because awareness of where each virtual conference participant is looking or gazing, e.g., who each person is looking at on an electronic display, is not accurately conveyed in virtual conferences, it can be extremely difficult to determine who is looking at whom from virtual conference video feeds. Also, in some instances, users may turn off their camera (web-camera, wearable device camera, smartphone camera, etc.) when participating in virtual video conferences, due to, for example, low network bandwidth, being in a shared environment or space, and/or concerns about privacy. This can lead to user experience issues similar to those associated with audio conferences.

SUMMARY

According to a general aspect, a method can include receiving, by a computing device, a photo of a virtual conference participant and a depth map based on the photo. The method can also include generating, by the computing device, a plurality of synthesized images based on the photo. The plurality of synthesized images can have respective simulated gaze directions of the virtual conference participant. The method can also include receiving, by the computing device during a virtual conference, an indication of a current gaze direction of the virtual conference participant. The method can further include animating, in a display of the virtual conference, an avatar corresponding with the virtual conference participant. The avatar can be based on the photo. Animating the avatar can be based on the photo, the depth map and at least one synthesized image of the plurality of synthesized images, the at least one synthesized image corresponding with the current gaze direction.

Implementations can include one or more of the following features. For example, the method can include defining a 3-dimensional (3D) mesh from the depth map, where animating the avatar can include applying at least a portion of the photo and at least a portion of the at least one synthesized image as a texture to the 3D mesh. Animating the avatar can performing one or more geometrical transformations of the 3D mesh based on the current gaze direction. The one or more geometrical transformations can include rotation, scaling, translation, or skewing. The depth map can include information indicating respective distances of surfaces of the photo from a fixed viewpoint. The 3D mesh can include a mesh of geometric shapes representing a 3D model of the photo.

The plurality of synthesized images can be a plurality of images generated from the photo using a machine learning model. The indication of the current gaze direction can include changes in the current gaze direction. The method can include low-pass filtering the indication of the current gaze direction, and animating the avatar can be based on the low-pass filtered indication of the current gaze direction.

Animating the avatar can include blending a first synthesized image of the plurality of synthesized images with a second synthesized image of the plurality of synthesized images. The current gaze direction can be between a simulated gaze direction of the first synthesized image and a simulated gaze direction of the second synthesized image. Blending the first synthesized image of the plurality of synthesized images with the second synthesized image of the plurality of synthesized images can include alpha blending.

The simulated gaze directions can be at respective equally spaced angles over 360 degrees.

Animating the avatar can include animating a periocular region of the virtual conference participant based on a segmentation mask.

The plurality of synthesized images can be a first plurality of synthesized images. The method can include generating, by the computing device, a second plurality of synthesized images based on the photo. The second plurality of synthesized images can have respective simulated mouth shapes of the virtual conference participant. The method can include receiving, by the computing device during the virtual conference, an audio signal indicating speech of the virtual conference participant. Animating the avatar can be further based on the audio signal and at least one synthesized image of the second plurality of synthesized images corresponding with the audio signal. The method can include selecting one or more synthesized images of the second plurality of synthesized images based on a pitch of the audio signal and an amplitude of the audio signal. The method can include, animating, in the avatar, a mouth region of the virtual conference participant based on the selected one or more synthesized images of the second plurality of synthesized images. Animating the avatar can include blending a first synthesized image of the second plurality of synthesized images with a second synthesized image of the second plurality of synthesized images.

Animating the avatar can include animating a mouth region of the virtual conference participant based on a segmentation mask.

According to another general aspect, a computing device can include at least one processor, and a non-transitory computer-readable medium storing executable instructions that, when executed by the at least one processor, can cause the computing device to receive a photo of a virtual conference participant and a depth map based on the photo. The executable instructions, when executed by the at least one processor, can cause the computing device to generate a plurality of synthesized images based on the photo. The plurality of synthesized images can have respective simulated gaze directions of the virtual conference participant. The executable instructions, when executed by the at least one processor, can cause the computing device to receive, during a virtual conference, an indication of a current gaze direction of the virtual conference participant, and animate, in a display of the virtual conference, an avatar corresponding with the virtual conference participant. The avatar can be based on the photo. Animating the avatar can be based on the photo, the depth map and at least one synthesized image of the plurality of synthesized images. The at least one synthesized image can correspond with the current gaze direction.

Implementations can include one or more of the following features. For example, the executable instructions can include instructions that, when executed by the at least one processor, cause the computing device to define a 3-dimensional (3D) mesh from the depth map. Animating the avatar can include applying at least a portion of the photo and at least a portion of the at least one synthesized image as a texture to the 3D mesh. Animating the avatar can include performing one or more geometric transformations on the 3D mesh based on the current gaze direction.

The plurality of synthesized images can be a first plurality of synthesized images, and the executable instructions can include instructions that, when executed by the at least one processor, can cause the computing device to generate a second plurality of synthesized images based on the photo. The second plurality of synthesized images can have respective simulated mouth shapes of the virtual conference participant. The executable instructions can include instructions that, when executed by the at least one processor, can cause the computing device to receive, during the virtual conference, an audio signal indicating speech of the virtual conference participant. Animating the avatar can be further based on the audio signal and at least one synthesized image of the second plurality of synthesized images corresponding with the audio signal.

The executable instructions can include instructions that, when executed by the at least one processor, can cause the computing device to select one or more synthesized images of the second plurality of synthesized images based on a pitch of the audio signal and an amplitude of the audio signal and animate a mouth region of avatar of the virtual conference participant based on the selected one or more synthesized images of the second plurality of synthesized images.

The computing device can include a wearable device.

According to another general aspect, a non-transitory computer-readable medium storing executable instructions that, when executed by at least one processor, can cause the computing device to receive a photo of a virtual conference participant and a depth map based on the photo. The executable instructions, when executed by the at least one processor, can cause the computing device to generate a plurality of synthesized images based on the photo. The plurality of synthesized images can have respective simulated gaze directions of the virtual conference participant. The executable instructions, when executed by the at least one processor, can cause the computing device to receive, during a virtual conference, an indication of a current gaze direction of the virtual conference participant, and animate, in a display of the virtual conference, an avatar corresponding with the virtual conference participant. The avatar can be based on the photo. Animating the avatar can be based on the photo, the depth map and at least one synthesized image of the plurality of synthesized images. The at least one synthesized image can correspond with the current gaze direction.

Implementations can include one or more of the following features. For example, the plurality of synthesized images can be a first plurality of synthesized images. The executable instructions can include instructions that, when executed by the at least one processor, can cause the computing device to generate a second plurality of synthesized images based on the photo, the second plurality of synthesized images having respective simulated mouth shapes of the virtual conference participant, and receive, during the virtual conference, an audio signal indicating speech of the virtual conference participant. Animating the avatar can be based on the audio signal and at least one synthesized image of the second plurality of synthesized images corresponding with the audio signal.

In another general aspect, a method can include receiving, by a computing device, a photo of a virtual conference participant and a plurality of synthesized images based on the photo. The plurality of synthesized images can have respective simulated gaze directions of the virtual conference participant. The method can also include receiving, by the computing device during a virtual conference, an indication of a current gaze direction of the virtual conference participant. The method can further include animating, in a display of the virtual conference, an avatar corresponding with the virtual conference participant. The avatar can be based on the photo. Animating the avatar can be based on the photo, the depth map and at least one synthesized image of the plurality of synthesized images, the at least one synthesized image corresponding with the current gaze direction.

According to another general aspect, a computing device can include at least one processor, and a non-transitory computer-readable medium storing executable instructions that, when executed by the at least one processor, can cause the computing device to receive a photo of a virtual conference participant and a plurality of synthesized images based on the photo. The plurality of synthesized images can have respective simulated gaze directions of the virtual conference participant. The executable instructions, when executed by the at least one processor, can cause the computing device to receive, during a virtual conference, an indication of a current gaze direction of the virtual conference participant, and animate, in a display of the virtual conference, an avatar corresponding with the virtual conference participant. The avatar can be based on the photo. Animating the avatar can be based on the photo, the depth map and at least one synthesized image of the plurality of synthesized images. The at least one synthesized image can correspond with the current gaze direction.

DETAILED DESCRIPTION

Figure 1A:
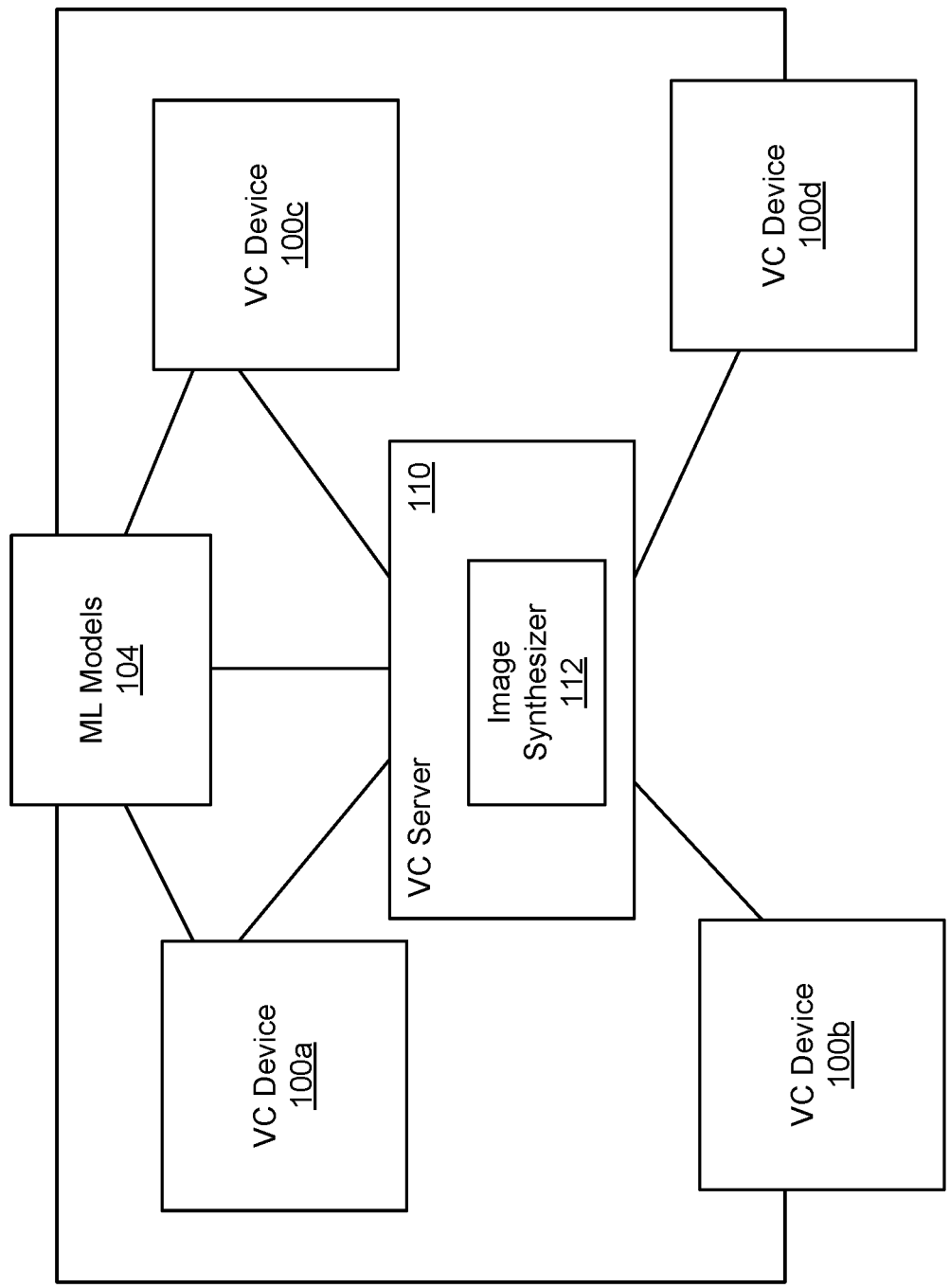
FIG. 1A is a block diagram illustrating a system for virtual conferencing according to an aspect.

This disclosure is directed to approaches for virtual conferencing that can address at least some of the drawbacks and poor user experience with video conferencing. For instance, other participants in such a conference may only see still profile photos (or no photo at) for virtual conference participants that do not have a camera, or have turned off a camera of a device used for participating in a virtual conference. This can make it difficult to determine who is speaking and impossible to determine who is looking at whom in such a conference.

Briefly, the approaches described herein can be used in virtual conferencing (web conferencing, online conferencing, etc.) to render animated and photo realistic avatars of participants in a virtual conference, without streaming live video. As described herein, such approaches can include the use of eye tracking, e.g. such as implemented in augmented reality glasses, and neural rendering. For instance, in the approaches described herein, machine learning techniques can be used to generate a set of synthesized images, e.g., based on a photograph of a person. Those synthesized images can then be used to render a photorealistic avatar of the person in a video conference display, such as a smartglasses, display, or other electronic display, such as a world-placed screen (e.g., a display other than in a head-mounted, device, such augmented reality glass). In the disclosed approaches, such avatar animation can be based on the synthesized images (pre-generated or locally generated images), gaze-tracking information for a corresponding virtual conference participant and/or an audio signal (e.g., speech) from the virtual conference participant that is captured using a microphone included in an electronic device used for participating in a virtual conference, e.g., smartglasses, smartphone, laptop, etc.

Using the approaches described herein, virtual conferencing that includes rendering a conference display with animated avatars can be implemented. In disclosed implementations, each animated avatar can be based on a photo of a conference participant, along with a set of synthesized images (e.g., gaze direction and mouth shapes) generated from the photo, eye tracking of the participant and/or audio of the participant. Such approaches for video conferencing can reduce bandwidth, as compared to conferencing with real-time video), protect privacy, and improve user experience through use of gaze and/or speech aware animation of photorealistic avatars for virtual conference participants.

Further in the described implementation, depth maps generated from a photograph can be converted to a 3D mesh, and segmentation masks of eye and/or mouth regions of a conference participants, bandwidth used and computation complexity for animated avatar rendering can be further reduced. For instance, such approaches can include interpolating between synthesized gaze images, and/interpolating between synthesized mouth shape images for speech (or not speaking with closed mouth shape). Using such approaches, virtual conferencing (e.g., a group conversation pipeline) that utilizes only still profile photos, speech, and gaze information to render animated and photorealistic experiences can be provided.

While the described approaches are generally discussed in the context of smartglasses implementations, it will be appreciated that the described approaches can be implemented using other appropriate devices. For instance, the disclosed techniques can be implemented using a combination of earbud headphones, in combination with a smartwatch and/or a smartphone; a head mounted display other than smartglasses; a laptop computer with a web camera; and so forth.

Figure 1B:
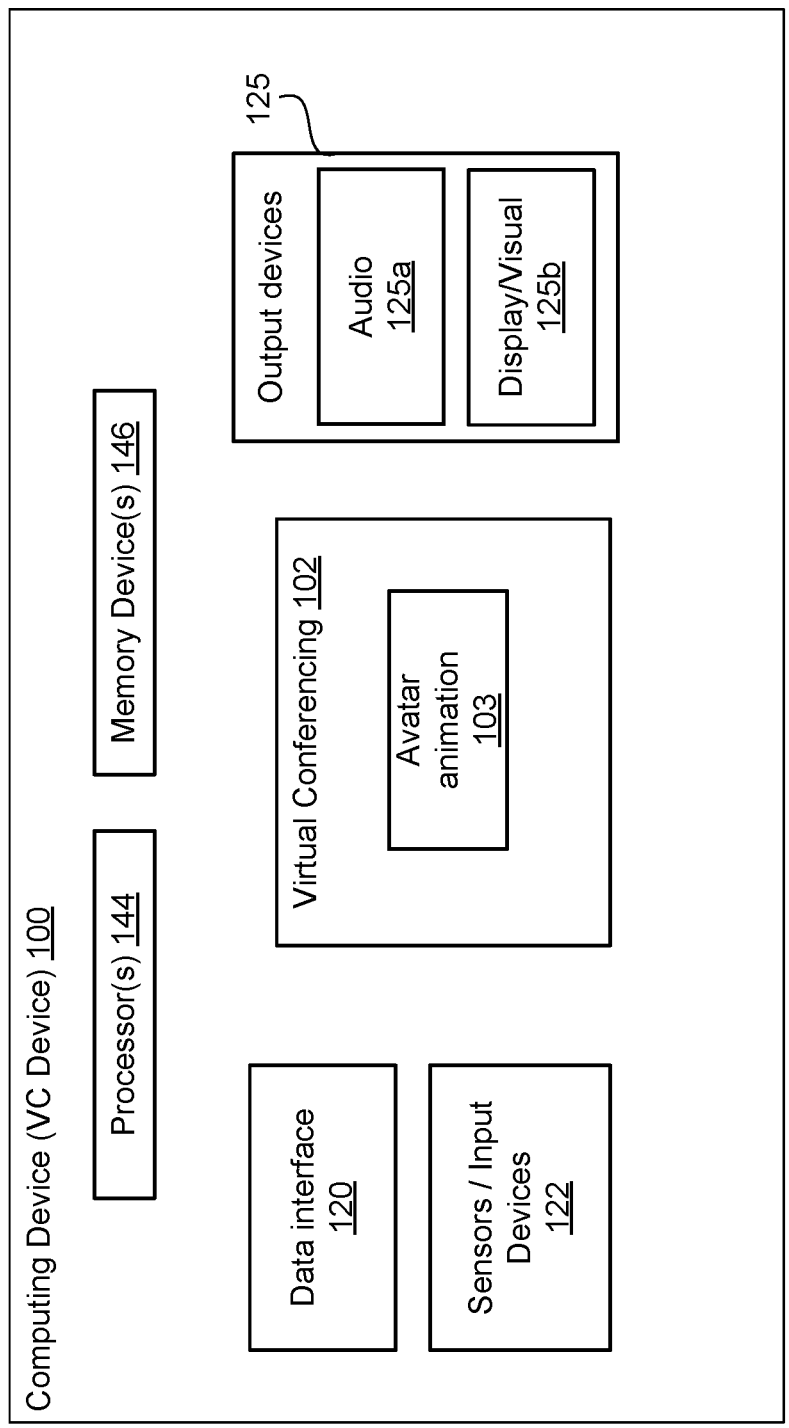
FIG. 1B is a block diagram illustrating a computing device (e.g., a virtual conferencing device) according to an aspect.

FIGS. 1A and 1B, will be briefly described to provide an example context for the approaches described herein, with additional details being discussed further below. The arrangements of FIGS. 1A and 1B are given by way of example, and for purposes of illustration. Other arrangements for implementing the approaches for animation of avatars in a virtual conference described herein are possible. FIG. 1A is a block diagram illustrating a system for virtual conferencing (VC) according to an aspect. FIG. 1B is a block diagram illustrating a computing device (a VC device) 100 according to an aspect.

As shown in FIG. 1A, the example VC system includes a plurality of VC devices 100a, 100b, 100c, and 100d. While four VC devices are shown, the number of VC devices participating in a virtual conference can vary. In the system of FIG. 1A, the VC devices 100a-100d are operationally coupled with a VC server 110, which can provide virtual conferencing services to the VC devices 100a-100d. In an implementation, the VC devices 100a-100d can be operationally coupled with the VC server 100 via a data network, such as the Internet. As shown in FIG. 1A, the VC server 110 can include an image synthesizer 112, which can operate using one or more ML models 104 to generate synthesized images, such as those described herein. In some implementations, the VC devices 100a-100d can implement an image synthesizer, and synthesized images for avatar animation can be locally generated by the VC devices.

In the example of FIG. 1A, the ML models 104 are illustrated as being operationally coupled with the VC devices 100a-100d and the VC server 110. Depending on the particular implementation, appropriate ML models 104 can be implemented in the VC devices 100a-100d, the VC server 110, and/or in other electronic devices. In some implementations, other devices can be used to generate synthesized images, such as the VC devices 100a-100d.

FIG. 1B illustrates a computing device (VC device) 100. In an implementation, the computing device 100 can be used to implement one or more of the VC devices 100a-100d in the system of FIG. 1A. As shown in FIG. 1B, the computing device 100 can include a virtual conferencing application 102, a data interface 120, sensors/input devices 122, output devices 125, one or more processors 144 and one or more memory devices 146. As also shown in FIG. 1B, the VC application 102 can implement (include) avatar animation 103, that can use synthesized images produced by the image synthesizer 112 and the ML models 104 to animate photorealistic avatars of VC participants. As also shown in FIG. 1B, in this example, the output devices 125 can include an audio output device 125a, e.g., for providing VC audio, and a display/visual output device 125b, e.g., for providing a VC display including animated participant avatars, such as described herein. Again, as noted above, further details of the example implementations of FIGS. 1A and 1B are discussed below.

As noted above, in some implementations, such as the example of FIGS. 1A-1D, described techniques can be implemented in a computing device (or multiple computing devices) using one or more machine-learning (ML) models 104. In some implementations, other approaches can be used, such as conventional programming logic. In the implementations described herein, the ML models 104 can be ML models that are trained to synthesize images from a photo. For instance, one or more of the ML models 104 can be trained to synthesize, from a photo of a person, a set of images of the person with different gaze directions for animating changes in gaze direction or gaze point, and/or a set of images of the person with different mouth shapes for animating the person when speaking. Depending on the implementation, a set of gaze direction images can be synthesized separately from a set of mouth shape images. For example, an ML model for generating gaze direction images can be trained using images of people gazing in different directions, while another ML model for generating different mouth shapes can be trained using videos of people speaking, where synthesized mouth shapes can be based on pitch and amplitude of associated speech. The particular ML model(s) 104 included in, or used by the system 100 will, of course, depend on the particular implementation.

In the example implementation of FIGS. 1A-1D, such ML models 104 can receive a photo of a person that was previously captured or is captured using a camera of a VC device 100a-100d, for example. In an implementation, such ML models can be implemented in the VC server 110 shown in FIG. 1A, or could be implemented in the VC devices 100a-100d. The pre-trained ML model(s) 104 can then, based on the received photo, synthesize a set of gaze direction images and a set of mouth shape images. For instance, the ML models 104 can synthesize a set of gaze direction images with, respectively, different gaze angles, where the gaze angles are equally distributed over a 360 degree range. For instance, in an implementation, respective images with 20 different gaze direction (gaze angle) images can be synthesized, where the separation between adjacent gaze angles is 18 degrees, though a different number of gaze angles, with corresponding angular separation, can be synthesized. Similarly, in an implementation, respective images with 10 different mouth shapes can be synthesized, where the range of shapes ranges for fully closed to fully open, though a different number of mouth shapes can be synthesized. These synthesized images (gaze direction and/or mouth shape) can then be used by the avatar animation 103 of the computing device 100 to animate a corresponding, photorealistic avatar using the approaches described herein. In an implementation the avatar animation 103 can also be configured to generate synthesized images used for photorealistic avatar animation.

In example implementations, the computing device (VC device) 100 can include a wearable device which can include one or more sub-devices, where at least one of the sub-devices is a device capable of providing virtual conferencing services (e.g., virtual conferencing application 102) to a user of the computing device 100. For instance, in some implementations, the computing device 100 may include a head-mounted display (HMD) device such as an optical head-mounted display (OHMD) device, a transparent heads-up display (HUD) device (e.g., in a vehicle), an augmented reality (AR) device, or other devices such as goggles or headsets having sensors, display, and computing capabilities. However, as previously noted, the described implementations are not limited to head-mounted display devices. For instance, the computing device 100 may include other types of wearable device such as earbuds, watches, fitness trackers, cameras, body sensors, and/or any other, non-wearable, computing device that can provide VC services to a user.

The computing device 100 can include smartglasses, where the smartglasses are implemented as an optical head-mounted display device designed in the shape of a pair of eyeglasses. For example, smartglasses are glasses that add information (e.g., project a display) alongside, or overlaid with what the wearer (user) views through the glasses. For example, the computing device 100 can include a display that is projected onto the field of view of the user. The display may include a liquid crystal display (LCD), a light-emitting diode (LED) display, an organic light-emitting display (OLED), an electro-phoretic display (EPD), or a micro-projection display adopting an LED light source. In some examples, the display may provide a transparent or semi-transparent display such that a user wearing the glasses can see images provided by the display but also information located in a field of view of the smartglasses behind the projected images. In some examples, the below description is explained in terms of smartglasses, but the described implementations may be applied to other types of wearable computing devices and/or combinations of mobile/wearable computing devices working together.

As shown in FIG. 1A, the computing device 100 includes one or more processor(s) 144, which may be formed in a substrate configured to execute one or more machine executable instructions or pieces of software, firmware, or a combination thereof. The processor(s) 144 can be semiconductor-based—that is, the processor(s) 144 can include processed semiconductor material that is configured to perform or execute digital logic. The computing device 100 can also include one or more memory devices 146. The memory devices 146 may include any type of storage device that stores information in a format that can be read and/or executed by the processor(s) 144. The memory device(s) 146 may store executable instructions that when executed by the processor(s) 144 cause the processor(s) 144 to perform any of the operations discussed herein. In some examples, the memory devices 146 which can store information received or generated by computing device 100. Also, the memory devices 146 may include applications and modules (e.g., virtual conferencing 102, avatar animation 103, etc.) that, when executed by the processor(s) 144, perform the operations discussed herein. In some examples, such applications and modules may be stored in an external storage device and loaded into the memory devices 146 when needed for executing the processor(s) 144.

In some examples, the computing device 100 can include one or more server computers. In some examples, the computing device 100 can include one or more client computers (e.g., desktop computers, laptops, tablets, smartphones, smartglasses, etc.). In some examples, the computing device 100 can include one or more server computers and one or more client computers.

As noted above, an image synthesizer, such as the image synthesizer 112 in the example of FIG. 1A, can operate in conjunction with one or more of the machine-learning (ML) models 104, where an ML model 104 can be a predictive model. In some implementations, an ML model 104 can include a neural network trained for synthesizing images from a photo for use in avatar animation. For instance, the ML model(s) 104 may be an interconnected group of nodes, each node representing an artificial neuron. The nodes of the ML 104 can be connected to each other in layers, with the output of one layer becoming the input of a next layer. The ML model 104 receives an input (or inputs), e.g., by an input layer, and then transforms the received input(s) through a series of hidden layers and produces an output (or outputs) via the output layer. Each layer is made up of a subset of the set of nodes. The nodes in hidden layers are fully connected to all nodes in the previous layer and provide their output to all nodes in the next layer. The nodes in a single layer function independently of each other (i.e., do not share connections). Nodes in the output layer provide the transformed input(s), e.g., the outputs, to a requesting process. In some implementations, an ML model 104 can be a convolutional neural network, which is a neural network that is not fully connected. Convolutional neural networks therefore have less complexity than fully connected neural networks. Convolutional neural networks can also make use of pooling or max-pooling to reduce the dimensionality (and hence complexity) of the data that flows through the neural network, which can, as a result, reduce a level of computation used to arrive at a given output(s) based corresponding inputs. Accordingly, such approaches can make computation of the output(s) in a convolutional neural network faster than in fully-connected neural networks.

Figure 1C:
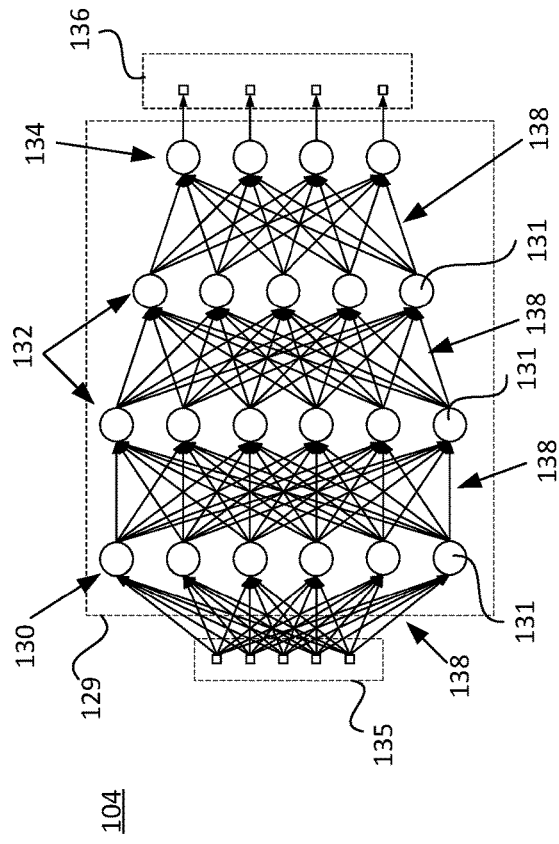
FIG. 1C illustrates an example of a machine-learning (ML) model according to an aspect.

FIG. 1C illustrates an ML model 104 (e.g., a neural network) that is fully connected according to an aspect. The ML model 104 includes a set of computational processes for receiving a set of inputs 135 (e.g., input values) and generating a set of outputs 136 (e.g., output values). In some examples, each output value of the set of outputs 136 may represent an attribute 106 determined by the notification adaptor 102 (e.g., from the ML model(s) 104). In the example of FIG. 1C, the input values 135 may represent a received photo, or photos of a user (e.g., from the sensors 122, such as a camera, or from a memory device 146). The ML model 104 can include a plurality of layers 129, where each layer 129 includes a plurality of neurons 131. The plurality of layers 129 may include an input layer 130, one or more hidden layers 132, and an output layer 134. In some examples, each output of the output layer 134 represents a synthesized image, e.g., a gaze direction image or a mouth shape image).

In some examples, the ML model 104 can be a deep neural network (DNN). For example, a deep neural network (DNN) may have one or more hidden layers 132 disposed between the input layer 130 and the output layer 134. However, the ML model 104 may be any type of artificial neural network (ANN) including a convolution neural network (CNN). The neurons 131 in one layer 129 are connected to the neurons 131 in another layer via synapses 138. For example, each arrow in FIG. 1C may represent a separate synapse 138. Fully connected layers 129 (such as shown in FIG. 1C) connect every neuron 131 in one layer 129 to every neuron in the adjacent layer 129 via the synapses 138.

Each synapse 138 can be associated with a weight. A weight is a parameter within the ML model 104 that transforms input data within the hidden layers 132. As an input enters the neuron 131, the input is multiplied by a weight value and the resulting output is either observed or passed to the next layer in the ML model 104. For example, each neuron 131 has a value corresponding to the neuron's activity (e.g., activation value). The activation value can be, for example, a value between 0 and 1 or a value between −1 and +1. The value for each neuron 131 is determined by the collection of synapses 138 that couple each neuron 131 to other neurons 131 in a previous layer 129. The value for a given neuron 131 is related to an accumulated, weighted sum of all neurons 131 in a previous layer 129. In other words, the value of each neuron 131 in a first layer 129 is multiplied by a corresponding weight and these values are summed together to compute the activation value of a neuron 131 in a second layer 129. Additionally, a bias may be added to the sum to adjust an overall activity of a neuron 131. Further, the sum including the bias may be applied to an activation function, which maps the sum to a range (e.g., zero to 1). Possible activation functions may include (but are not limited to) rectified linear unit (ReLu), sigmoid, or hyperbolic tangent (TanH).

Figure 1D:
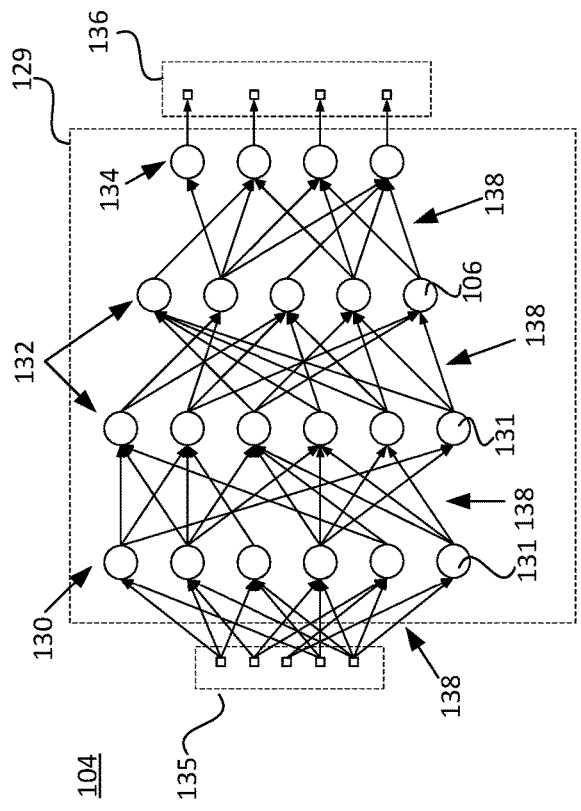
FIG. 1D illustrates an example of an ML model according to another aspect.

FIG. 1D illustrates an ML model 104 that is partially connected. For example, similar to FIG. 1C, the ML model 104 includes a set of computational processes for receiving a set of inputs 135 (e.g., input values) and generating a set of outputs 136 (e.g., output values). Also, the ML model 104 of FIG. 1D includes a plurality of layers 129, where each layer 129 includes a plurality of neurons 131, and the layers 129 include an input layer 130, one or more hidden layers 132, and an output layer 134. The neurons 131 in one layer 129 are connected to neurons 131 in an adjacent layer 129 via the synapses 138. However, unlike FIG. 1C, the ML model 104 is not fully connected, where every neuron 131 in one layer 129 is not connected to every neuron in the adjacent layer 129 via the synapses 138.

Referring back to FIGS. 1A and 1B, the image synthesizer 112 may receive one or more photos of a person (e.g., a VC participant). In some implementations, the image synthesizer 112 may receive the one or more photos from the computing device 100, e.g., via the data interface 120 over a network, such as the Internet. In some examples, the computing device 100 can be configured to provide the one or more photos using an image capture device of the sensors/input device 122, and/or from photos saved on a storage device 146.

The image synthesizer 112 can then, e.g., in conjunction with the ML models 104, synthesize images that can be used for avatar animation in a virtual conferencing platform. For instance, the ML model(s) 104 can be configured (trained) to synthesize images with different gaze directions and/or mouth shapes using one or more still photos, such as from a single photo of a person looking straight ahead (into a camera), with their mouth closed or open. The use of the ML model 104 to synthesize such images, in combination with the other techniques described herein, may reduce the number of computation resources (e.g., processing power, memory, etc.) to provide avatar animation in a VC platform, such as VC application 102 in FIG. 1B.

Figure 2:
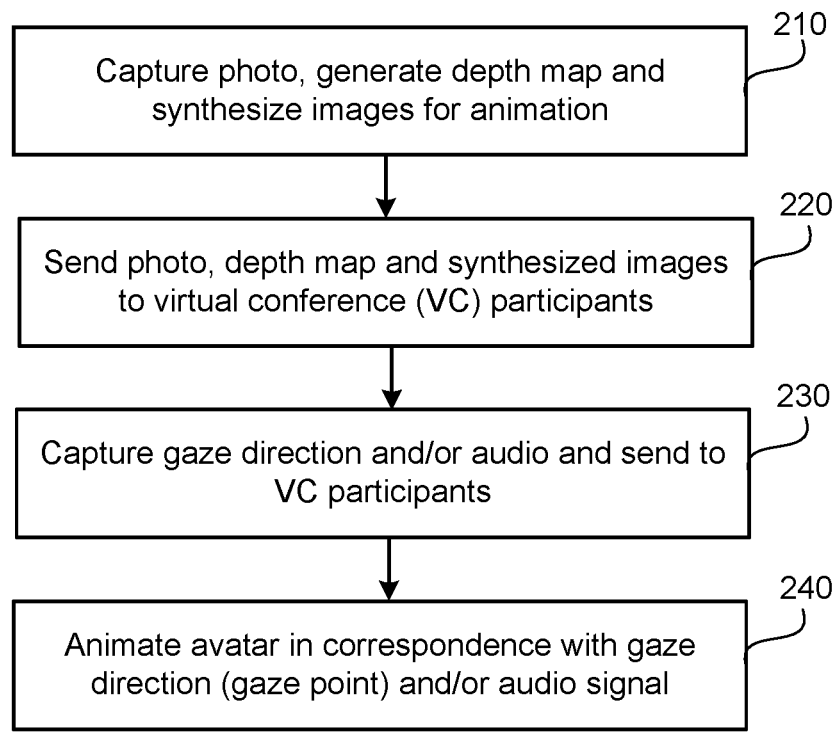
FIG. 2 is a flowchart illustrating a method for virtual conferencing including avatar animation according to an aspect.

FIG. 2 is a flowchart illustrating a method 200 for virtual conferencing including avatar animation according to an aspect. In an example, the method 200 can be implemented using the approaches described herein. Depending on the particular approach, the operations of the method 200 can be implemented in the system of FIG. 1A, in the computing device 100 of FIG. 1B, and/or using other devices not shown in FIGS. 1A and 1B. For instance, in this example, the operations of the method 200 can be implemented by one or more of the VC devices 100a-100d (e.g., implemented using the computing device 100), and/or by the VC server 110.

As shown in FIG. 2, at block 210, the method 200 includes capturing a photo, generating a depth map from the photo and synthesizing, from the photo and/or the depth map, images, such as gaze direction and/or mouth shape images, that can be used for avatar animation. In implementations, the device that is used to generate such synthesized images can vary based on the particular implementation (e.g., a VC server, a VC device, a computing device configured to perform image synthesis, etc.). In the approaches described herein, a depth map can be used for animation of an avatar, where a 3-dimensional (3D) mesh can be generated from the depth map, and the photo and synthesized images can be applied, as a texture, to the 3D mesh to animate a corresponding avatar. For instance, a depth map can be generated using a depth sensor included in an electronic device that is used to capture the original photo of the user, using a mixed data sampling regression model applied to a digitized color image of the photo, or using an AR framework to determine the depth map from the photo. The associated 3D mesh can then be generated from the depth map using one of a number of techniques, such as dense quad tessellation or using neural radiance fields.

In an implementation, a depth map can be an image and/or an image channel that contains information relating to, or indicating respective distances of surfaces in an image from a particular viewpoint, e.g., a fixed viewpoint such as a camera, a depth sensor, etc. That is, a depth map can include information about how far each pixel of an image (e.g., a photo) is from a camera used to capture the image. A 3D mesh generated from a depth map can be represented as a mesh of geometric shapes, such as triangles, square, rectangles, etc. The 3D mesh can be 3D model of the face (e.g., an approximation for use in rendering a photorealistic avatar). In an implementation, the photo and/or synthesized images, such as blended images, can be applied to the 3D mesh to render the corresponding photorealistic avatar.

At block 220, the photo (original photo), the depth map, the synthesized images, and/or the 3D mesh are sent to computing devices of other participants in a virtual conference. In implementations, the 3D mesh can be generated by the image synthesizer 112, or by the avatar animation 103 functionality of the virtual conferencing platform 102. In some implementations, the 3D mesh can be generated in other ways, such as using a separate process and/or a different computing device to generate a 3D mesh for avatar animation.

At block 230, during a virtual conference, gaze direction (gaze point) information can be determined for a user associated with the avatar to be animated. Such gaze information, representing where the user is looking at a display of a virtual conference, can be determined using an eye tracking algorithm, such an algorithm implemented on smartglasses, e.g., using the sensors/input devices, or an algorithm implemented using another computing device, such as a smartphone, a laptop computer with a webcam, etc. Also, audio information (e.g., an audio signal associated with speech of the user) can be captured by an audio input device on an associated VC device. The captured gaze information and/or speech information can, also at block 230, be sent (continuously sent to reflect changes in gaze and audio stream) to other VC participants. At block 240, a photorealistic avatar for the user can then be animated using the provided gaze point information and/or the provided audio signal using the approaches described herein.

Figure 3:
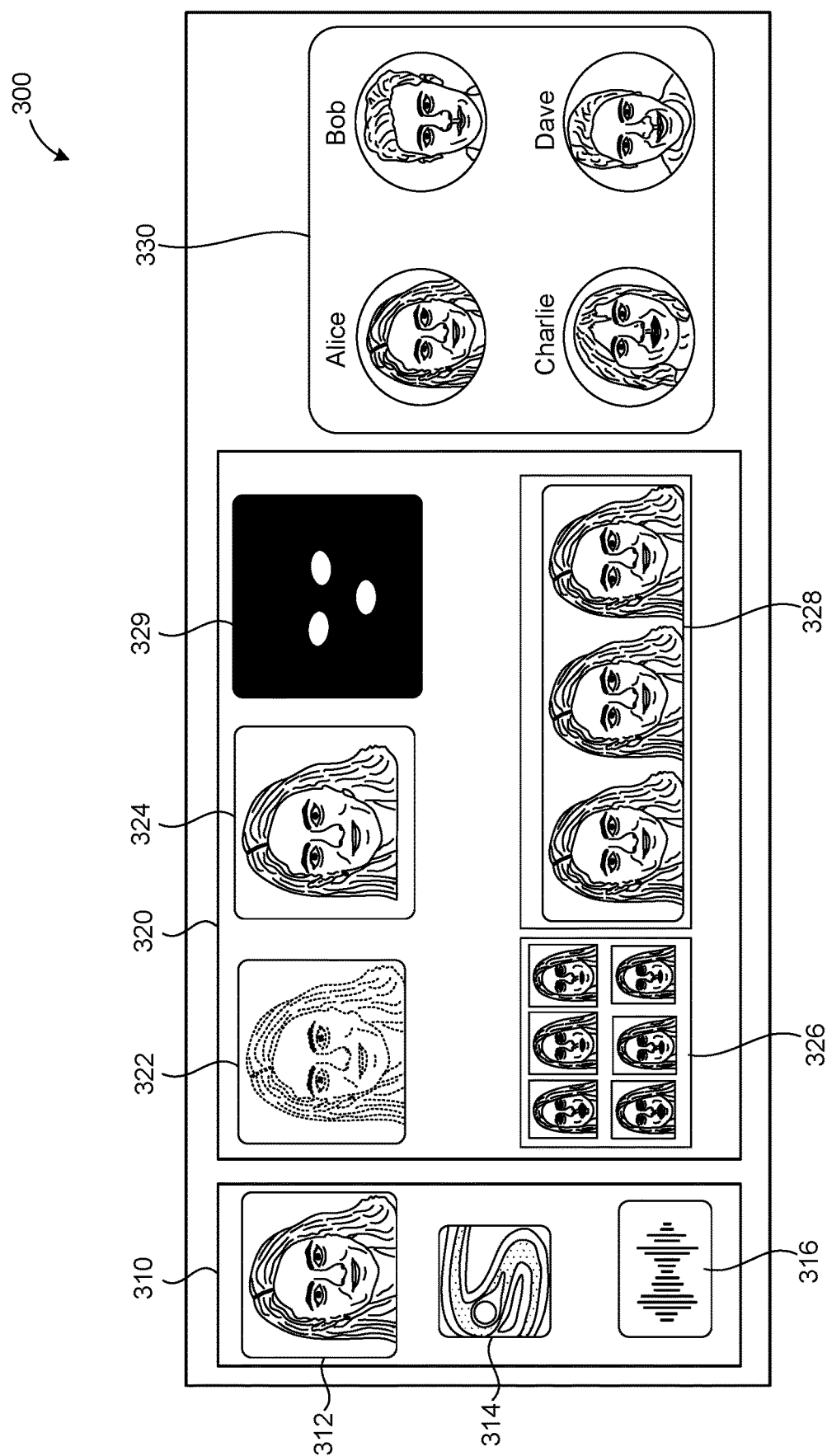
FIG. 3 is a diagram illustrating input data, intermediate results and a corresponding virtual conference display for virtual conferencing including avatar animation according to an aspect.

FIG. 3 is a diagram 300 illustrating input data 310 (source data, input information, etc.), intermediate results 320 and a corresponding virtual conference display 330 associated with providing virtual conferencing including avatar animation using the approaches described herein according to an aspect. As shown in FIG. 3, the input data 310 includes a photo of a person, referred to as Alice in this example, gaze direction indications 314 for Alice during a virtual conference with Charlie, Bob and Dave, and an audio signal 316 associated with Alice's speech during a video conference in which photorealistic, animated avatars are rendered. The intermediate results 320 of FIG. 3, which can be obtained from the photo 312, include a depth map 322, a 3D photo 324, a set of synthesized images 326 with different mouth shapes, a set of synthesized images 328 with different gaze directions, and a segmentation mask 329.

In an implementation, the 3D photo 324 can include a 3D mesh generated from the depth map 322, with the photo 312 applied to the 3D mesh as a texture. The segmentation mask 329, in this example, can be generated using image segmentation approaches to identify a periocular (eye) region of Alice, as well as a mouth region for Alice. In some implementations, different segmentation masks can be used for the eye and mouth regions, respectively. In an implementation, such segmentation masks can be used to specify regions of a corresponding avatar to be animated, such as an eye region and/or a mouth region. In such approaches, the synthesized images 326 and 328 can be used in combination with the photo 312 (or 3D photo 324) to apply a texture to an associated 3D mesh (e.g., a 3D mesh included in the 3D photo 324) to animate the corresponding avatar, e.g., in the VC display 330.

As noted above, different approaches can be used to generate the depth map 322. For instance, a trained neural network (e.g., an ML model) can be used to infer depths represented in the depth map 322 from the photo 312. In some implementations, a depth sensor can be used, e.g., when capturing the photo 312, to generate the depth map 322, or an AR framework can be used to create a depth map from the photo 312. In some implementations, other approaches for generating a depth map can be used.

The synthesized images 326 and 328 can be generated using respective ML models (neural networks) that are trained using an image animation model. For instance, an ML model can be trained, using a first order motion model, to generate synthesized mouth shape images and gaze direction images (e.g., 10 different mouth shapes and 20 different gaze directions in example given above). In some implementations, an ML model can be used during a virtual conference to animate a VC participant's (Alice's) mouth based on a real-time transcription of speech included in the audio signal 316 provided to other VC participants.

After providing/generating the photo, the synthesized images, the 3D mesh, and one or more segmentation masks for a VC participant, the approaches described herein can be used to animate a photorealistic avatar using the synthesized images and one or segmentation masks. That is, an associated photorealistic avatar of the user can be animated based on gaze direction information 314 and/or speech information 316 that is streamed during a virtual conference. Such animated avatars can be generated on smartglasses worn by VC participants, generated on a smartphone or computer and transmitted (e.g., via WiFi, or other wired or wireless communication protocol) to a head-mounted display, or displayed on a computing device that is not head mounted or wearable, such as a laptop, netbook, monitor, and so forth. Such approaches can provide VC participants with a video conference experience without using bandwidth and computing power to obtain and stream live video.

In such approaches, when a user (Alice) is looking at another person, e.g., another participant's avatar, in the VC display 330, as can be determined from provided eye-tracking gaze point information, Alice's avatar can then be animated to look at that person in the VC display 330. For example, as shown in FIG. 3, gaze information provided for Alice can indicate she is looking, within a threshold distance in the VC display 330, at Dave. That gaze information can then be used (e.g., transmitted to other VC participants) and an avatar for Alice can be animated to look at Dave in the VC display 330. Such animation can include rotating the 3D mesh for Alice's avatar, based on Alice's current gaze direction, and applying a texture to the associated 3D mesh that is based on her photo 312, one or more of the synthesized gaze direction images 328 and the segmentation mask 329. If Alice is also speaking, the mouth region of her avatar in the VC display 330 can also be animated based on her photo 312, one or more of the synthesized mouth shape images 326, and a segmentation mask using similar approaches as for gaze animation.

Figure 4A:
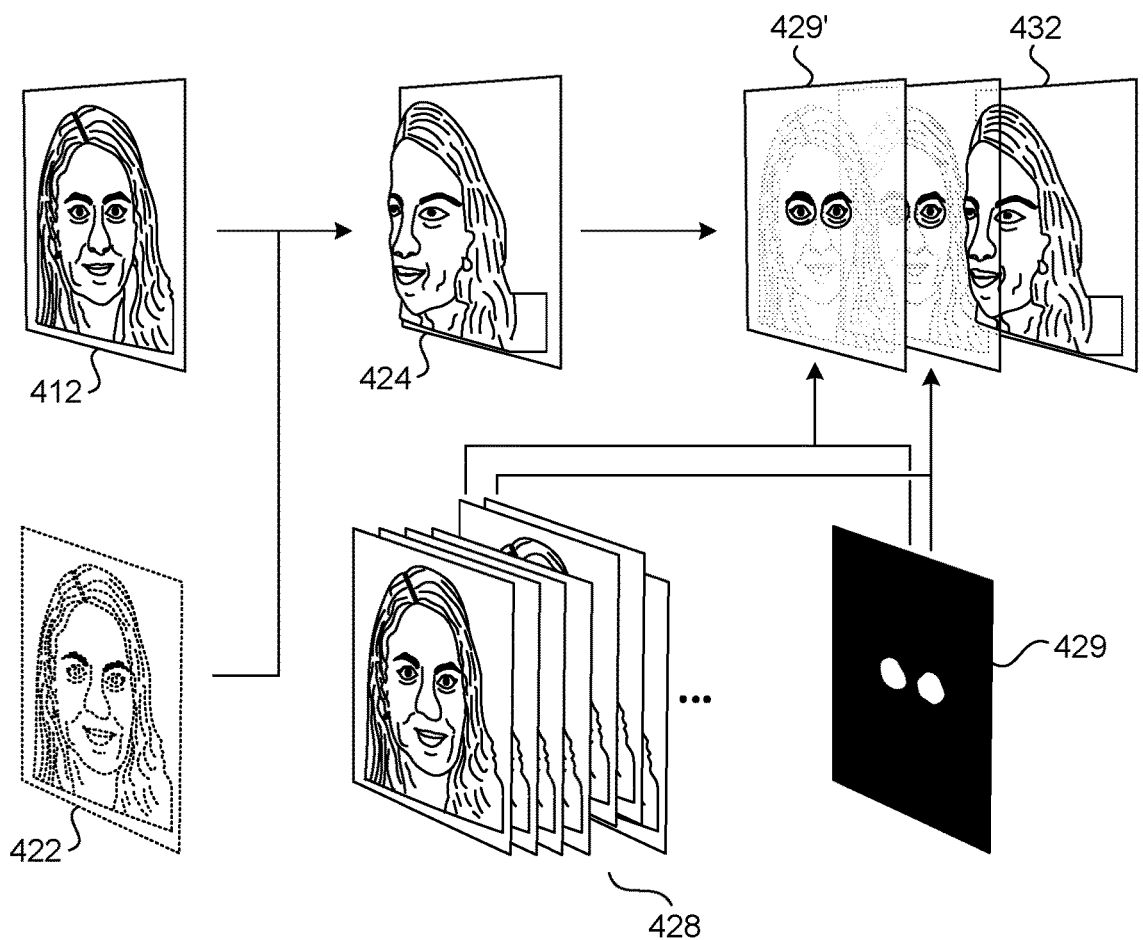
FIG. 4A is a diagram that schematically illustrates an approach for avatar animation according to an aspect.

FIG. 4A is a diagram that schematically illustrates an approach for avatar animation according to an aspect. Specifically, the example of 4A schematically illustrates animation of gaze redirection for the VC participant Alice of the example of FIG. 3. As shown in FIG. 4A, a photo 412 of Alice can be captured and/or uploaded to, e.g., the VC server

110 of FIG. 1A. Using the image synthesizer 112, in conjunction with one or more ML models 104, the VC server can generate a depth map 322, a 3D mesh/3D photo 424 and a set of synthesized gaze direction images 428 that represent Alice gazing in different directions (e.g., at equally spaced angles).

At the beginning of a virtual conference, the photo 412, the synthesized images 428, the depth map 422, and/or the 3D photo 424 for each VC participant can be sent (e.g., sent once) to other participants for use in rendering real-time avatar animation for gaze direction and/or speech by the VC participants for which such information is provided. During the chat, each VC device can execute an eye-tracking algorithm that identifies who the corresponding user is looking at in a VC display, e.g., on augmented/virtual reality glasses, smartglasses, or other display. Each VC device can send current gaze point location, as determined by the eye tracking algorithm, and/or an audio signal including speech of an associated VC participant to the VC server for broadcast to other VC participant(s). The VC devices can then use the provided information (e.g., images, photo, depth map, 3D mesh, gaze point and/or audio signal) to render gaze-aware 3D photorealistic avatars. In some implementations, synthesized images can be generated by the VC devices.

For gaze redirection animation, as in the example of FIG. 4A, the gaze point information can be used in conjunction with the images, photos and depth information (e.g., 3D mesh) provide at the beginning of the virtual conference to synthesize animated gaze images that are applied to the 3D photo 424 using a segmentation mask 420 to render a photorealistic avatar 432 that represents a current gaze point for the corresponding VC participant, Alice from the previous example. For instance, the synthesized gaze images for photorealistic avatar 432 can be generated using blending (e.g., eye texture blending) in the 3D photo 424's eye region, such in constrained by the segmentation mask 429 applied to the 3D photo 424 (without or without portion of an associated 3D mesh), such as shown by the image 429', where the segmentation mask 429 is applied to the 3D photo 424. While not specially shown in FIG. 4A, real-time animation of a mouth region for Alice can also be rendered using similar approaches, where blending of mouth shape images is performed for real-time avatar animation, where selection of mouth shapes for blending can be selected based on a pitch and amplitude of a provided audio signal, or can be based on a real-time transcription of the audio signal, e.g., using a speech-to-text conversion.

Figure 4B:
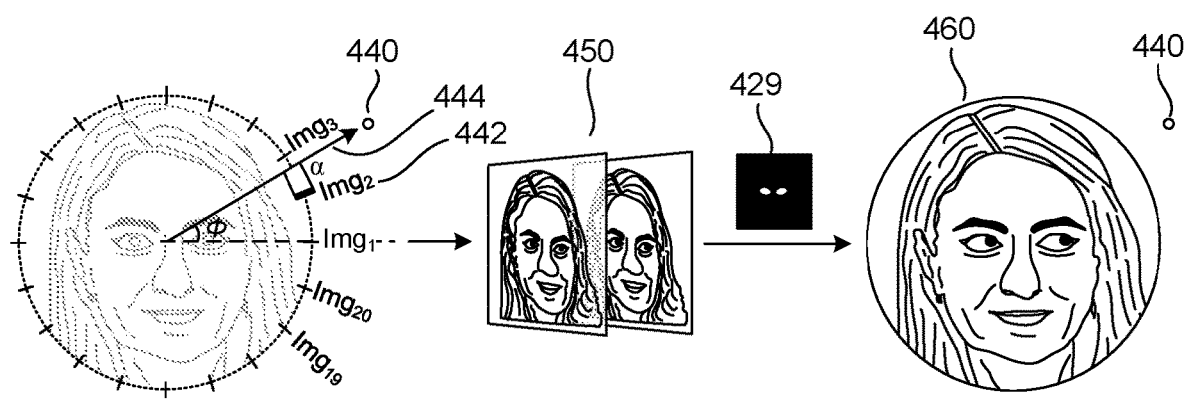
FIG. 4B is a diagram that illustrates gaze redirection animation according to an aspect.

FIG. 4B is a diagram that illustrates gaze redirection animation according to an aspect. In the example of FIG. 4B, a gaze point 440 can be determined based on information provided by an eye-tracking algorithm. The determined gaze point 440 can be mapped onto a cartesian coordinate grid, where a corresponding (x, y) location and associated gaze direction angle α can then be determined. In such an approach, the origin (0, 0) of the cartesian coordinate grid can be assigned as the center of the original photo 412 of FIG. 4A, or as a gaze point that represents the person looking straight ahead. Based on the determined gaze angle α, two images from the synthesized gaze direction images 428 can be selected, where the selected images are those with gaze direction angles closest to (bounding) a. For instance, in this example, the selected images are referenced as Img$_2$ 442 and Img$_3$ 444, which can be blended 450 using alpha blending with a blending ratio of 1-α:α, such as described further below. As described herein, the eye regions of the blended images can be chosen, specified, bounded, identified, etc. using a segmentation mask 429. Resulting gaze redirection animation can include replacing the original 3D photo 424's eye region using the image blending 450 to redirect the avatar's gaze in correspondence with the determined x, y gaze location. The image 460 illustrates a corresponding rendering result in which Alice is looking at the gaze point 440.

During rendering for gaze redirection, the real-time gaze point is used to determine the corresponding gaze angle, such as described above. This gaze angle is then used to select synthesized images that are blended to display, or animate a synthesized gaze, or gaze redirection. In the example of FIG. 4B, as noted above, the current gaze point is (x, y) and the image center (straight ahead gaze point) is assigned to be at the cartesian coordinate origin (0,0). An associated rotation angle, using the example above of 20 synthesized images, can be calculated as $$\phi_{cur} = \arctan\left(\frac{y}{x}\right)$$

and its corresponding index calculated as $$i_{cur} = \frac{10 \cdot \phi cur}{\pi}.$$

If the gaze position is close to the profile's center, e.g., within a threshold distance, the gaze direction of the original photo 412's (or 3D photo 424's) can be used for avatar animation rendering to achieve the effect of the avatar looking straight forward. If, instead, the current gaze point is off center, e.g., greater than a threshold distance, synthesized gaze direction images can be selected from the set of synthesized images 428 e.g., from {Img$_1$, Img$_2$, . . . , Img$_{20}$} based on their corresponding gaze angles {ϕ$_i$}. That is the i-th and (i+1)-th image can be selected such that i=⌊i$_{cur}$⌋ and i+1=⌈i$_{cur}$⌉. Alpha blending can then be used to obtain the final gaze redirection image using the following blending formula, Img$_{final}$=(1−α)Img$_i$+αImg$_{(i+1)}$, where α=i$_{cur}$−i. In some implementations, a low-pass filter (e.g., Kalman filter) can be applied to provided gaze point information, to make associated animation more fault tolerant, e.g., to account for blinking, and/or brief (e.g., 2 to 5 milliseconds) changes in gaze location.

Rotation of a 3D mesh of an associated animated avatar can also follow the current gaze point by rotating the 3D mesh. In an implementation, such 3D mesh rotation can be determined as 0.1 cos ϕ$_{cur}$ and 0.1 sin ϕ$_{cur}$ along the x and y axes respectively, based on the (x, y) gaze location. Such an approach provides a relative rotation transformation, rather than an absolute transformation. That is the rotation is determined by the gaze point and not by movement of a user's head (up, down, forward, backward, etc.).

In some implementations, animation of an avatar can include other geometric transformations that are performed in addition to, or instead of rotation. Such geometric transformations can include translation, skewing, or scaling). Translation can include moving the 3D mesh from one point in a 3D plane to another point in the 3D plane. Skewing can include altering (e.g., deforming) at least a portion of the 3D mesh. Scaling can include increasing or decreasing a size of the 3D mesh, where relative distances between point in the 3D mesh are maintained.

Again, as noted above, animation of a mouth region to correspond with speech included in an audio signal can be done using similar approaches. For instance, such mouth shape animation can be accomplished by blending synthesized mouth shape images based on a pitch and an amplitude of a corresponding audio signal, or based on a real-time transcription of the audio signal.

Figure 5:
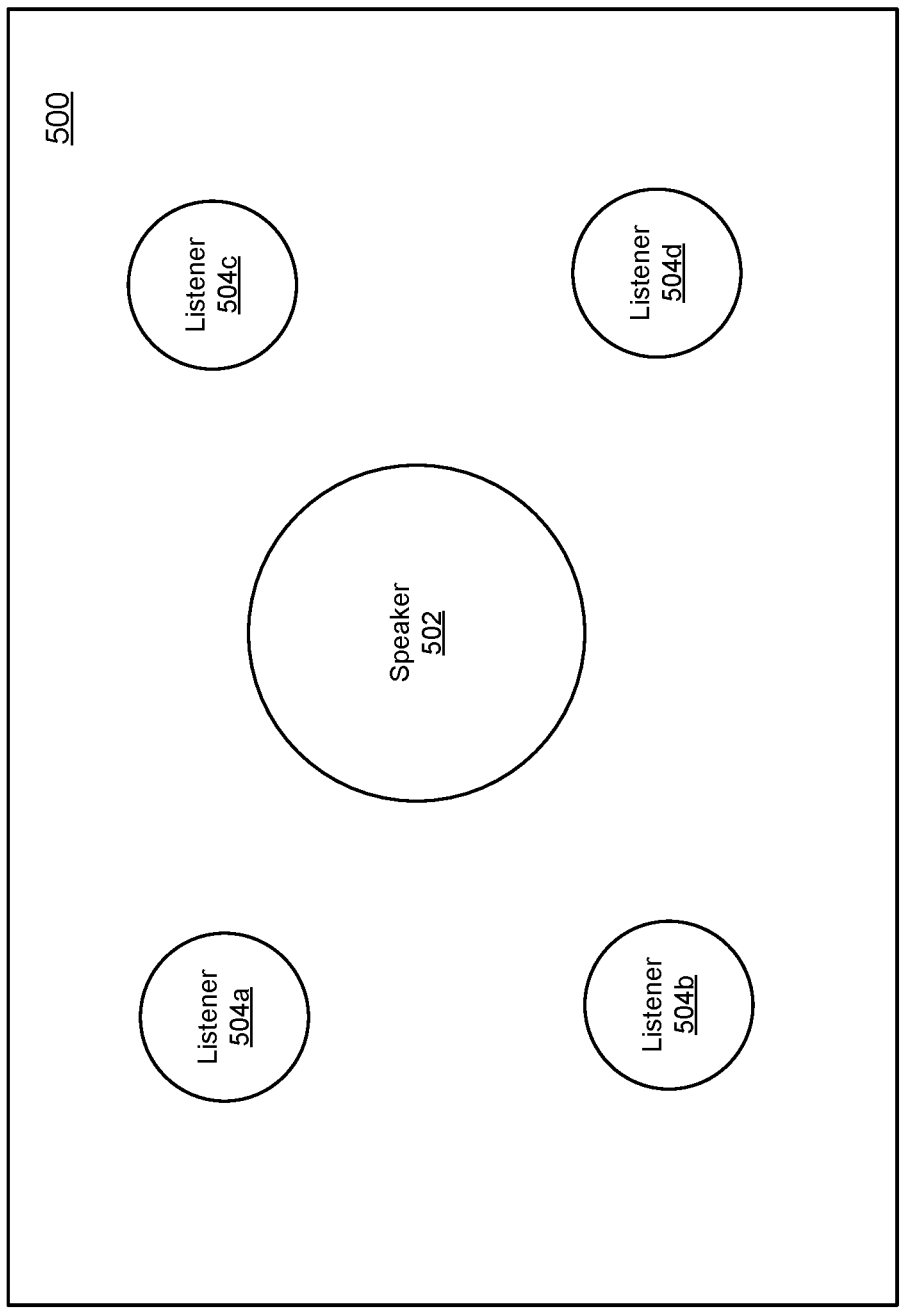
FIG. 5 is a diagram that schematically illustrates a virtual conferencing display according to an aspect.

FIG. 5 is a diagram that schematically illustrates a virtual conferencing display 500 according to an aspect. As shown in FIG. 5, the display 500 can be arranged such that an avatar for a speaker 502 (current speaker) is placed in the center of the display 500, while avatars for listeners 504a, 504b, 504c and 504d are placed, or rendered around the speaker 502's avatar. As also shown in FIG. 5, the display for the speaker 502's avatar can be larger, relative to the avatars for the listeners 504a-504d. In such a VC platform, avatars can be swapped between the speaker 502's position and listeners 504a-504d's positions. In an implementation, such changes can occur in response to the person that is speaking changing, and/or in response to gaze directions of VC participants changing from a current speaker 502 to a listener of the listeners 504a-504d. The positions of the corresponding avatars can then be swapped, resulting in a different participant's avatar, the new speaker, being shown as the speaker 502, and the previous speaker being moved to the new speaker's previous listener location in the display 500.

Figure 6:
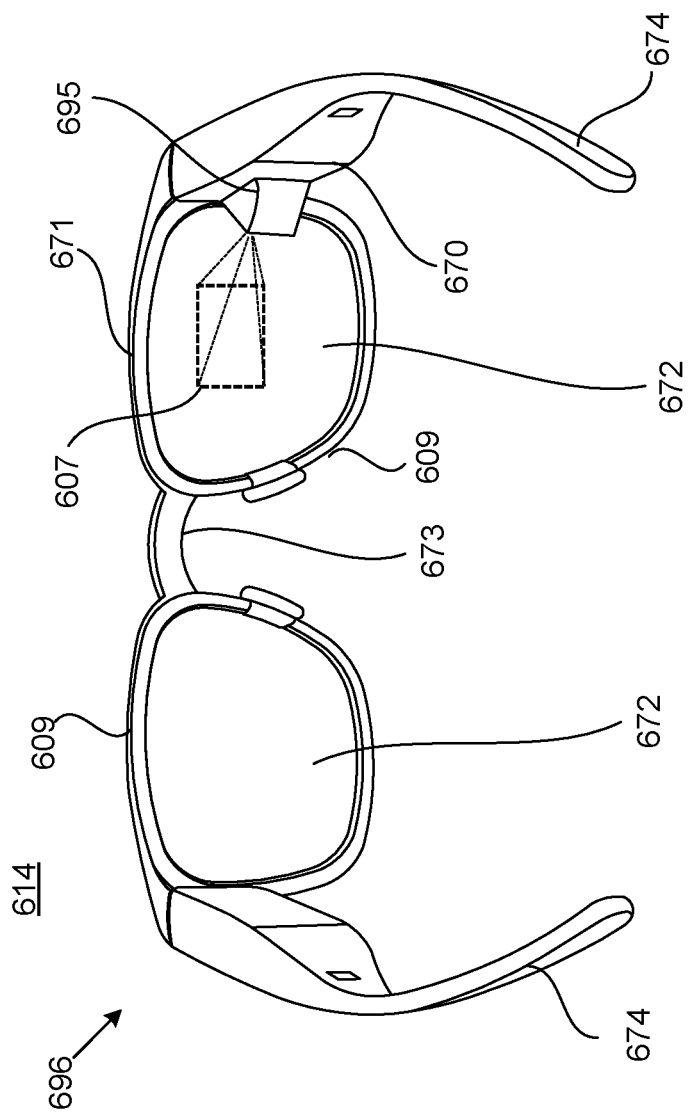
FIG. 6 illustrates an example of a head-mounted display (wearable) device according to an aspect.

FIG. 6 illustrates an example of smartglasses 696 that can, in some implementations, be included in, or implement the computing devices (virtual conferencing devices) 100a-100d of FIG. 1A and/or the computing device (virtual conferencing device) 100 of FIG. 1B, and which can implement approaches for providing animating avatars in a virtual conference setting, such as the approaches described herein. In this example, the smartglasses 696 are glasses that add information (e.g., project a display 607) alongside, or overlaid with what the wearer (a user) views through the glasses. For example, the smartglasses 696 may include a display device 695 configured to project the display 607. In some examples, the display device 695 may include a see-through near-eye display. For example, the display device 695 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 672, next to content (for example, text notifications, digital images, user interface elements, virtual content, and the like) generated by the display device 695. In some implementations, waveguide optics may be used to depict content on the display device 695.

In some examples, instead of projecting information, the display 607 includes an in-lens micro display. In some examples, the display 607 is referred to as an eye box. In some examples, smartglasses 696 (e.g., eyeglasses or spectacles), are vision aids, including lenses 672 (e.g., glass or hard plastic lenses) mounted in a frame 671 that holds them in front of a person's eyes, typically utilizing a bridge portion 673 over the nose, and arm portions 674 (e.g., temples or temple pieces) which rest over the ears. The bridge portion 673 may connect rim portions 609 of the frame 671. The smartglasses 696 of FIG. 6 include an electronics component 670 that can include circuitry of the smartglasses 696, such as the sensors 122 of FIG. 1B. In some examples, the electronics component 670 can be included in, or integrated into one of the arm portions 674 (or both of the arm portions 674) of the smartglasses 696.

The smartglasses 696 can also include an audio input device, an audio output device (such as, for example, one or more speakers), an illumination device, a sensing system (such as including sensors such as those described herein), a control system, at least one processor, and/or an outward facing image sensor, or camera. In some examples, the smartglasses 696 may include a gaze tracking device including, for example, one or more sensors, to detect and track eye gaze direction and movement. e.g., which information can be provided to virtual conference participants for use in avatar animation using the approaches described herein. For instance, data captured by the sensor(s) may be processed to detect and track gaze direction and movement as a user input. Likewise, a microphone of the smartglasses 696 can be used to capture speech of a virtual conference participant, and an audio signal corresponding with that speech can be provided to other participants for avatar animation using the approaches described herein. In some examples, the sensing system may include various sensing devices and the control system may include various control system devices including, for example, one or more processors operably coupled to the components of the control system. In some implementations, the control system may include a communication module providing for communication and exchange of information between the wearable computing device and other external devices.

Figure 7:
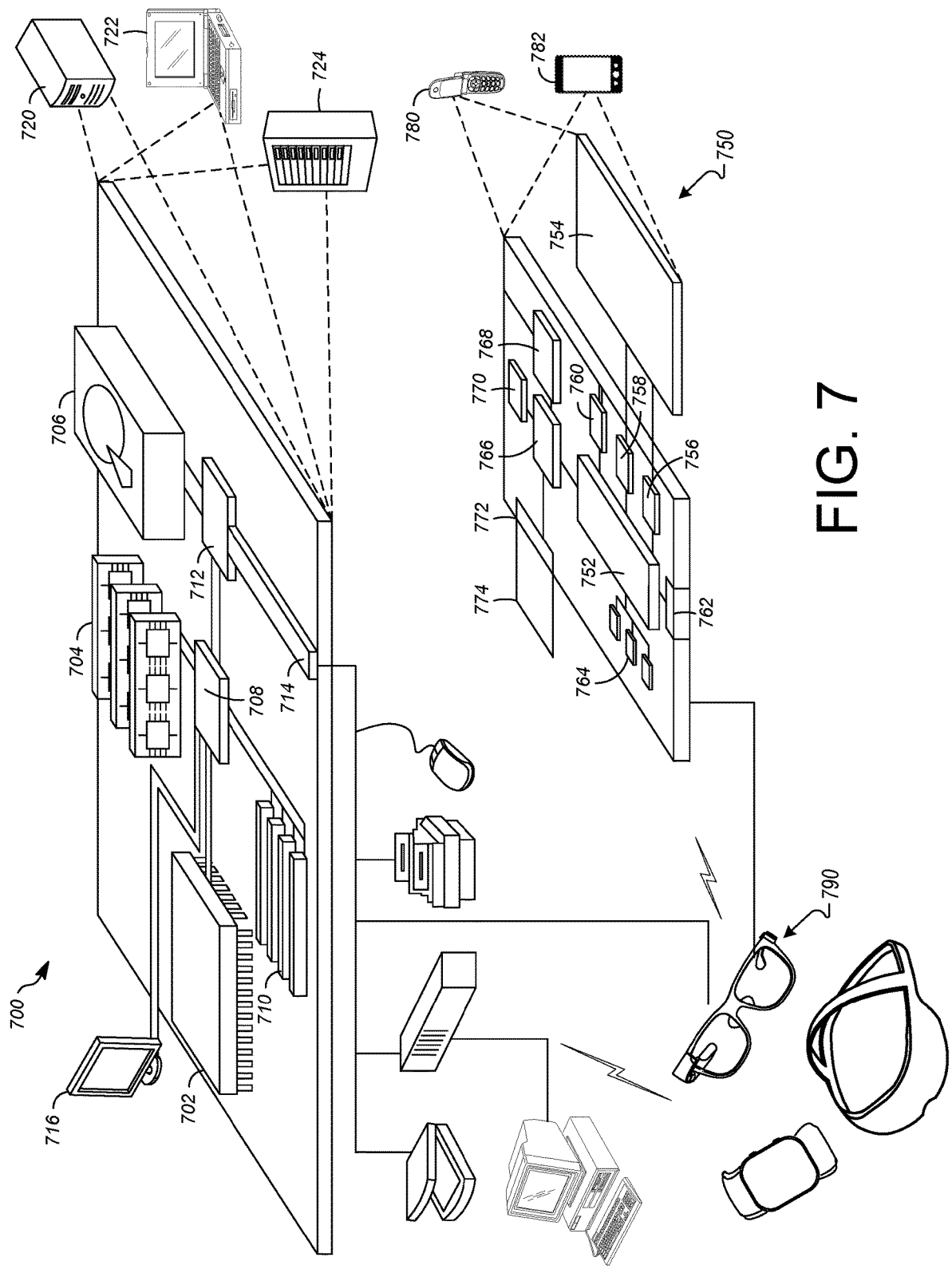
FIG. 7 illustrates example computing devices of the computing systems discussed herein according to an aspect.

FIG. 7 illustrates an example of a computer device 700 and a mobile computer device 750, which may be used with the techniques described here. The computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as A display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display), and LED (Light Emitting Diode) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750 or may also store applications or other information for device 750. Specifically, expansion memory 774 may include instructions to carry out or supplement the processes described above and may include secure information also. Thus, for example, expansion memory 774 may be provided as a security module for device 750 and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 790 to generate an augmented environment for viewing inserted content within the physical space. For example, one or more sensors included on a computing device 750 or other computing device depicted in the figure, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790. The user's interactions with the computing device may be translated to interactions with a user interface generated in the AR environment for a controllable device.

In some implementations, a computing device 750 may include a touchscreen. For example, a user can interact with the touchscreen to interact with a user interface for a controllable device. For example, the touchscreen may include user interface elements such as sliders that can control properties of the controllable device.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
 receiving, by a computing device:
  a photo of a virtual conference participant; and
  a depth map based on the photo;
 generating, by the computing device, a plurality of synthesized images based on the photo and the depth map, the plurality of synthesized images having respective simulated gaze directions of the virtual conference participant;
 receiving, by the computing device during a virtual conference, an indication of a current gaze direction of the virtual conference participant, the indication of the current gaze direction includes changes in the current gaze direction;
 filtering the indication of the current gaze direction using a low-pass filter; and
 animating, in a display of the virtual conference, an avatar corresponding with the virtual conference participant, the avatar being based on the photo, and the animating the avatar being based on:
  the photo, the depth map and at least one synthesized image of the plurality of synthesized images, the at least one synthesized image corresponding with the current gaze direction; and
  the filtered indication of the current gaze direction.

2. The method of claim 1, further comprising defining a 3-dimensional (3D) mesh from the depth map, wherein animating the avatar includes applying at least a portion of the photo and at least a portion of the at least one synthesized image as a texture to the 3D mesh.

3. The method of claim 2, wherein the 3D mesh includes a mesh of geometric shapes representing a 3D model of the photo.

4. The method of claim 2, wherein animating the avatar further includes performing at least one geometric transformation on the 3D mesh based on the current gaze direction.

5. The method of claim 4, wherein the at least one geometric transformation includes one or more of:
 rotation of the 3D mesh;
 scaling of the 3D mesh;
 translation of the 3D mesh; or
 skewing of the 3D mesh.

6. The method of claim 1, wherein the depth map includes information indicating respective distances of surfaces of the photo from a fixed viewpoint.

7. The method of claim 1, wherein the plurality of synthesized images is a plurality of images generated from the photo using a machine learning model.

8. The method of claim 1, wherein animating the avatar includes blending a first synthesized image of the plurality of synthesized images with a second synthesized image of the plurality of synthesized images.

9. The method of claim 8, wherein the current gaze direction is between a simulated gaze direction of the first synthesized image and a simulated gaze direction of the second synthesized image.

10. The method of claim 8, wherein blending the first synthesized image of the plurality of synthesized images with the second synthesized image of the plurality of synthesized images includes alpha blending.

11. The method of claim 1, wherein the respective simulated gaze directions are at respective equally spaced angles over 360 degrees.

12. The method of claim 1, wherein animating the avatar includes animating a periocular region of the virtual conference participant based on a segmentation mask.

13. The method of claim 1, wherein the plurality of synthesized images is a first plurality of synthesized images, the method further including:
 generating, by the computing device, a second plurality of synthesized images based on the photo and the depth map, the second plurality of synthesized images having respective simulated mouth shapes of the virtual conference participant; and
 receiving, by the computing device during the virtual conference, an audio signal indicating speech of the virtual conference participant, wherein animating the avatar is further based on the audio signal and at least one synthesized image of the second plurality of synthesized images corresponding with the audio signal.

14. The method of claim 13, further comprising:
selecting one or more synthesized images of the second plurality of synthesized images based on a pitch of the audio signal and an amplitude of the audio signal; and
animating, in the avatar, a mouth region of the virtual conference participant based on the selected one or more synthesized images of the second plurality of synthesized images.

15. The method of claim 13, wherein animating the avatar includes blending a first synthesized image of the second plurality of synthesized images with a second synthesized image of the second plurality of synthesized images.

16. The method of claim 1, wherein animating the avatar includes animating a mouth region of the virtual conference participant based on a segmentation mask.

17. A computing device, comprising:
at least one processor; and
a non-transitory computer-readable medium storing executable instructions that, when executed by the at least one processor, cause the computing device to:
receive:
a photo of a virtual conference participant; and
a depth map based on the photo;
generate a plurality of synthesized images based on the photo, the plurality of synthesized images having respective simulated gaze directions of the virtual conference participant;
receive, during a virtual conference, an indication of a current gaze direction of the virtual conference participant, the indication of the current gaze direction includes changes in the current gaze direction;
filtering the indication of the current gaze direction using a low-pass filter; and
animate, in a display of the virtual conference, an avatar corresponding with the virtual conference participant, the avatar being based on the photo, and
the animating the avatar being based on:
the photo, the depth map and at least one synthesized image of the plurality of synthesized images, the at least one synthesized image corresponding with the current gaze direction; and
the filtered indication of the current gaze direction.

18. The computing device of claim 17, wherein the executable instructions include instructions that, when executed by the at least one processor, cause the computing device to:
define a 3-dimensional (3D) mesh from the depth map, wherein animating the avatar includes applying at least a portion of the photo and at least a portion of the at least one synthesized image as a texture to the 3D mesh.

19. The computing device of claim 18, wherein animating the avatar further includes performing at least one geometric transformation of the 3D mesh based on the current gaze direction.

20. The computing device of claim 17, wherein the plurality of synthesized images is a first plurality of synthesized images, and the executable instructions include instructions that, when executed by the at least one processor, cause the computing device to:
generate a second plurality of synthesized images based on the photo, the second plurality of synthesized images having respective simulated mouth shapes of the virtual conference participant; and
receive, during the virtual conference, an audio signal indicating speech of the virtual conference participant, wherein animating the avatar is further based on the audio signal and at least one synthesized image of the second plurality of synthesized images corresponding with the audio signal.

21. The computing device of claim 20, wherein the executable instructions include instructions that, when executed by the at least one processor, cause the computing device to:
select one or more synthesized images of the second plurality of synthesized images based on a pitch of the audio signal and an amplitude of the audio signal; and
animate a mouth region of avatar of the virtual conference participant based on the selected one or more synthesized images of the second plurality of synthesized images.

22. A non-transitory computer-readable medium storing executable instructions that, when executed by at least one processor, cause a computing device to:
receive:
a photo of a virtual conference participant; and
a depth map based on the photo;
generate a plurality of synthesized images based on the photo, the plurality of synthesized images having respective simulated gaze directions of the virtual conference participant;
receive, during a virtual conference, an indication of a current gaze direction of the virtual conference participant, the indication of the current gaze direction includes changes in the current gaze direction;
filtering the indication of the current gaze direction using a low-pass filter; and
animate, in a display of the virtual conference, an avatar corresponding with the virtual conference participant, the avatar being based on the photo, and
the animating the avatar being based on:
the photo, the depth map and at least one synthesized image of the plurality of synthesized images, the at least one synthesized image corresponding with the current gaze direction; and
the filtered indication of the current gaze direction.

23. The non-transitory computer-readable medium of claim 22, wherein the plurality of synthesized images is a first plurality of synthesized images, and the executable instructions include instructions that, when executed by the at least one processor, cause the computing device to:
generating a second plurality of synthesized images based on the photo, the second plurality of synthesized images having respective simulated mouth shapes of the virtual conference participant; and
receive, during the virtual conference, an audio signal indicating speech of the virtual conference participant, wherein animating the avatar is further based on the audio signal and at least one synthesized image of the second plurality of synthesized images corresponding with the audio signal.

24. The computing device of claim 17, wherein the respective simulated gaze directions are at respective equally spaced angles over 360 degrees.

25. The non-transitory computer-readable medium of claim 22, wherein the respective simulated gaze directions are at respective equally spaced angles over 360 degrees.

* * * * *